(12) United States Patent
Liu

(10) Patent No.: US 9,309,403 B2
(45) Date of Patent: Apr. 12, 2016

(54) HEAT RESISTANT, FLAME RETARDANT POLYLACTIC ACID COMPOUNDS

(71) Applicant: PolyOne Corporation, Avon Lake, OH (US)

(72) Inventor: Jing Liu, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/797,147

(22) Filed: Mar. 12, 2013

(65) Prior Publication Data

US 2014/0107241 A1    Apr. 17, 2014

Related U.S. Application Data

(60) Provisional application No. 61/715,094, filed on Oct. 17, 2012.

(51) Int. Cl.
| | |
|---|---|
| C08L 69/00 | (2006.01) |
| C08K 3/34 | (2006.01) |
| C08K 5/523 | (2006.01) |
| C08L 27/18 | (2006.01) |
| C08L 67/04 | (2006.01) |

(52) U.S. Cl.
CPC . *C08L 69/00* (2013.01); *C08K 3/34* (2013.01); *C08K 5/523* (2013.01); *C08L 27/18* (2013.01); *C08L 67/04* (2013.01)

(58) Field of Classification Search
USPC .................. 525/64, 65, 67; 524/127, 451
See application file for complete search history.

(56) References Cited

U.S. PATENT DOCUMENTS

| | | | |
|---|---|---|---|
| 5,300,576 A | 4/1994 | Nemphos et al. | |
| 5,321,064 A | 6/1994 | Vaidya et al. | |
| 5,446,078 A | 8/1995 | Vaidya et al. | |
| 5,847,011 A | 12/1998 | Ajioka et al. | |
| 5,952,450 A | 9/1999 | Ishihara et al. | |
| 6,022,550 A | 2/2000 | Watanabe | |
| 6,583,232 B1 | 6/2003 | Brown | |
| 6,605,681 B1 | 8/2003 | Villalobos et al. | |
| 6,869,985 B2 | 3/2005 | Mohanty et al. | |
| 6,984,694 B2 | 1/2006 | Blasius, Jr. et al. | |
| 7,160,937 B2 | 1/2007 | Shibuya et al. | |
| 7,256,223 B2 | 8/2007 | Mohanty et al. | |
| 7,268,190 B2 | 9/2007 | Ohme et al. | |
| 7,271,212 B2 | 9/2007 | Oguni et al. | |
| 7,354,656 B2 | 4/2008 | Mohanty et al. | |
| 7,504,452 B2 | 3/2009 | Hayata et al. | |
| 7,511,091 B2 | 3/2009 | Itagaki et al. | |
| 7,553,900 B2 | 6/2009 | Hayata et al. | |
| 7,645,850 B2 | 1/2010 | Freitag et al. | |
| 7,645,852 B2 | 1/2010 | Terado et al. | |
| 7,671,169 B2 | 3/2010 | Mullen et al. | |
| 7,767,744 B2 | 8/2010 | Yao et al. | |
| 7,863,382 B2 | 1/2011 | Ishii et al. | |
| 8,030,402 B2 | 10/2011 | Hirasawa | |
| 8,044,134 B2 | 10/2011 | Chung et al. | |
| 8,071,694 B2 | 12/2011 | Yu et al. | |
| 8,097,273 B2 | 1/2012 | Fukuhira et al. | |
| 8,133,943 B2 | 3/2012 | Cho et al. | |
| 8,304,048 B2 | 11/2012 | Ikeda et al. | |
| 8,304,476 B2 | 11/2012 | Yamanaka et al. | |
| 8,410,214 B2 | 4/2013 | Hayata et al. | |
| 8,445,593 B2 | 5/2013 | Ishii et al. | |
| 8,623,945 B2 | 1/2014 | Smit et al. | |
| 8,765,865 B2 | 7/2014 | Zhu et al. | |
| 9,062,201 B2 | 6/2015 | Zhu et al. | |
| 2007/0197740 A1 | 8/2007 | Hayata et al. | |
| 2007/0299227 A1 | 12/2007 | Gopferich et al. | |
| 2007/0299238 A1 | 12/2007 | Gopferich et al. | |
| 2007/0299240 A1 | 12/2007 | Gopferich et al. | |
| 2008/0153940 A1 | 6/2008 | Scheer et al. | |
| 2009/0043013 A1 | 2/2009 | Stahl et al. | |
| 2009/0221755 A1 | 9/2009 | Aoki et al. | |
| 2010/0222486 A1 | 9/2010 | Matsuno et al. | |
| 2010/0227963 A1 | 9/2010 | Hironaka et al. | |
| 2011/0034607 A1 | 2/2011 | Zhu et al. | |
| 2011/0071247 A1* | 3/2011 | Ishii et al. .................. 524/504 |
| 2012/0041086 A1* | 2/2012 | Sampath et al. ............. 521/59 |
| 2012/0121843 A1 | 5/2012 | Lebel et al. | |
| 2012/0220711 A1 | 8/2012 | Zhu et al. | |
| 2013/0317149 A1* | 11/2013 | Zhao et al. .................. 524/127 |
| 2014/0200295 A1 | 7/2014 | Liu | |
| 2014/0235740 A1 | 8/2014 | Liu | |
| 2015/0274966 A1* | 10/2015 | Zhu .......................... C08J 5/00 524/508 |

FOREIGN PATENT DOCUMENTS

| | | |
|---|---|---|
| JP | 2008106091 | 5/2008 |
| JP | 2008222987 | 9/2008 |
| JP | 2009079196 | 4/2009 |
| JP | 2009096881 | 5/2009 |
| JP | 2010144084 | 7/2010 |
| JP | 2011057803 | 3/2011 |
| KR | 1020110000440 | 1/2001 |
| KR | 1020100079518 | 7/2010 |
| WO | 2012/142266 | 10/2012 |

OTHER PUBLICATIONS

NatureWorks, "Technology Focus Report: Blends of PLA with Other Thermoplastics" (2007).
Sokolowski et al., "Joncryl ADR Chain Extenders" (Jul. 24, 2009).

* cited by examiner

*Primary Examiner* — Jeffrey Mullis
(74) *Attorney, Agent, or Firm* — Michael J. Sambrook; Maria M. Hoke; John H. Hornickel

(57) ABSTRACT

Significant disadvantages of the use of polylactic acid (PLA), lack of good heat stability and flame retardance, have been overcome by the use of resorcinol bis(diphenyl phosphate) in combination with talc. The compound achieves a threshold of 65° C. in heat deflection temperature and V-0 flame retardance at 1.6 mm thickness.

9 Claims, No Drawings

HEAT RESISTANT, FLAME RETARDANT POLYLACTIC ACID COMPOUNDS

CLAIM OF PRIORITY

This application claims priority from U.S. Provisional Patent Application Ser. No. 61/715,094 and filed on Oct. 17, 2012, which is incorporated by reference.

FIELD OF THE INVENTION

This invention relates to new compounds including polylactic acid and having increased heat resistance to improve structural integrity during use of the compound and flame retardance.

BACKGROUND OF THE INVENTION

Plastic articles have replaced glass, metal, and wood articles because plastic can be engineered to not shatter, rust, or rot. The durability of plastic articles also creates a disposal dilemma. Also, many plastic resins are made from petrochemicals, which have long-term supply and cost issues.

Therefore, there is a considerable effort underway to find biologically-derived and sustainable sources of thermoplastic resins, preferably those which degrade or compost to also resolve the disposal dilemma.

Polylactic acid, also known as polylactide or PLA, has been explored as a thermoplastic resin from biologically sustainable origins which can replace petrochemically originated resins.

PLA also needs to benefit from the addition of flame retardants, especially non-halogenated flame retardants.

SUMMARY OF THE INVENTION

While polylactic acid is probably one of the three most popular bio-derived resins being explored, it has the distinct disadvantage, as when compared to the fossil-derived resins it is meant to replace, in that it has a poor heat deflection temperature.

Heat deflection temperature (HDT) is a measurement of deflection of a sample under flexural load using the protocol of ASTM D648. The flexural load can be either of two settings. For purposes of this invention, 66 pounds per square inch (psi) or 455 kilo-Pascals (kPa) will be used for comparative measurements of heat deflection.

The problem with polylactic acid is that it has a heat deflection temperature under a 455 kPa flexural load of about 55° C. or 131° F. In other words, inside a automobile on an Arizona summer day, PLA would not be sturdy enough to be used as a thermoplastic resin molded into a passenger compartment component, as the case for an electronic handheld device laying on the seat, or as a piece of packaging containing perishable food in a grocery bag on the floor inside the automobile.

The problem with PLA is that it does not have sufficient heat resistance to allow it to be considered as a practical replacement for fossil-derived thermoplastic resins now used in many common plastic articles.

Addition of flame retardants to PLA compounds can adversely affect other properties, such as heat deflection temperature.

What the art needs is a heat resistant, flame retardant polylactic acid compound, in order that such compound can replace heat resistant thermoplastic compounds in which the thermoplastic resin is made from petrochemical sources obtained via mining or drilling into the earth while also providing acceptable non-halogenated flame retardant properties.

Another problem with PLA in some end use applications is that it is not suitably tough, i.e., resistant to impact. Brittle thermoplastic compounds, even if heat resistant, are not suitable for commercial uses.

The present invention solves that problem by compounding PLA with a particular amount of talc, resorcinol bis (diphenyl phosphate) as a non-halogenated flame retardant, and optionally an impact modifier, in order that the PLA compound has sufficient heat resistance, flame retardance and impact toughness to permit the PLA compound to replace a conventional thermoplastic compound.

The art has had a long-felt need for solving the heat resistance problem. Published literature of NatureWorks, LLC, a principal manufacturer of PLA, reports at natureworks.com that adding as much as 50% by weight of acrylonitrile-butadiene-styrene (ABS) to PLA to create a 50-50 PLA-ABS blend improves HDT by as little as 2° C. over the HDT of pure PLA polymer resin. Adding as much as 80% by weight of ABS to PLA does result in an improvement in HDT by 30° C., but at that mixture, it is actually more of an ABS polymer being modified by PLA.

Moreover, the art has had a long-felt need for solving the heat resistance problem, and it has been commonly characterized in some industries that a PLA compound should preferably have at least a 65° C. HDT at 66 psi to be a practical thermoplastic compound of both biologically sustainable origin and practical commercial use.

The art needs a means to increase the actual HDT values for PLA, while also retaining the resulting compound as principally significantly a PLA compound.

For purposes of this invention, the PLA should be the "significant component", meaning that PLA is present in at least about thirty weight percent (30%) of the compound.

It has been found, unexpectedly, that the combination of PLA, between 1 and 8 weight percent of talc, resorcinol bis (diphenyl phosphate), and optionally an acrylic impact modifier, can increase the HDT of a PLA compound to more than 65° C.

One aspect of the present invention is a heat resistant, flame retardant polylactic acid compound, comprising: (a) polylactic acid; (b) polycarbonate; (c) talc in an amount of from about 1 to 8 weight percent of the compound; and (d) resorcinol bis (diphenyl phosphate).

Another aspect of the present invention is a flame retardant plastic article formed from the compound described immediately above.

Features and advantages of the compound of the present invention will be further explained with reference to the embodiments and the examples showing the unexpected results.

EMBODIMENTS OF THE INVENTION

PLA

PLA is a well-known biopolymer, having the following monomeric repeating group in Formula I:

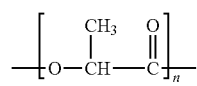

The PLA can be either poly-D-lactide, poly-L-lactide, or a combination of both. PLA is commercially available from NatureWorks, LLC located in all manufacturing regions of the world. Any grade of PLA is a candidate for use in the present invention. Currently, grades 4042D and 4032D are preferred. The number average molecular weight of PLA can be any which is currently available in a commercial grade or one which is brought to market in the future. To the extent that a current end use of a plastic article could benefit from being made from PLA and from having the heat resistance of the compound of the present invention, then that suitable PLA should be the starting point for constructing the compound of the present invention.

Polycarbonate

PC is truly a workhorse polymer well known to all skilled polymer chemists. It can be either aliphatic or aromatic in chemical character. It can be either a homopolymer or a copolymer in content.

Any commercially available PC is a candidate to be used in the present invention.

PC is commercially available in a number of grades from any number of commercial producers, including SABIC Innovative Plastics (formerly General Electric Plastics) Dow Chemical Company, Bayer Corporation, and many other companies worldwide.

PC useful in the present invention has a melt flow rate (MFR) ranging from about 2.5 g/10 min tested @ 300° C. and 1.2 kgf load to about 60 g/10 min tested @ 250° C. and 1.2 kgf load per ASTM D 1238.

Talc Heat Resistant Agent

Talc is well known as a functional filler useful in polymer compounds. What is unexpected is that a particular amount of talc makes resorcinol bis (diphenyl phosphate) useful as a non-halogenated flame retardant in a PLA/PC blend. More specifically, as is demonstrated in the examples below, in order to obtain a HDT of more than 65° C. and a flame retardance of V-0 at 1.6 mm thickness (ASTM D-635), the amount of talc can range from about 1 weight percent of the compound to 8 weight percent.

Talc is a naturally occurring mineral, identified generally as a hydrous magnesium silicate having a Chemical Abstract Services Number of CAS #14807-96-6. Its formula is $3MgO.4SiO_2.H_2O$.

Talc is available from a number of commercial sources. Non-limiting examples of such talc useful in this invention are Jetfil™ brand talcs from Luzenac America, Flextalc™ brand talcs from Specialty Minerals, Talcron™ brand talcs from Mineral Technologies, Inc., and Mistron™ brand talcs from Luzenac America.

Talc can have particle sizes ranging from about 0.5 μm to about 20 μm and preferably from about 0.7 μm to about 7 μm.

Flame Retardant

Non-halogen flame retardant additives for thermoplastic compounds can be selected from the categories of a variety of phosphorus-containing chemicals. In this invention, resorcinol bis (diphenyl phosphate) is used as the non-halogenated flame retardant. Resorcinol bis (diphenyl phosphate) has a Chemical Abstract Services Number of CAS #57583-54-7. One commercial source of resorcinol bis(diphenyl phosphate) is REOFOS™ brand flame retardant from Chemtura.

Optional Impact Modifier

Any conventional impact modifier is a candidate for use in compounds of the present invention. Core/shell impact modifiers, rubbery impact modifiers, etc. are suitable.

Of the various impact modifier candidates, Paraloid™ brand core/shell acrylic impact modifiers from Dow Chemical are suitable.

Acrylic impact modifier is optional, but preferred in this invention because more end use applications require impact resistance or toughness, than those which do not.

Optional Drip Suppressant

Any conventional drip suppressant is a candidate for use in the present invention because drip suppressants assist in the compound retain integrity during burning.

As identified in the published literature from Kaneka Corporation, a polycarbonate-containing compound using a siloxane/(meth)acrylate core/shell impact modifier can benefit from the addition of a drip suppressant, such as polytetrafluoroethylene (PTFE). Compounds of the present invention preferably include minor amounts of PTFE.

An additional benefit of the use of PTFE is that it is a known lubricant to assist in processing of the compound during melt-mixing or during final shaping of the plastic article.

Even though PTFE is fluorinated, the very minor amount present, if any, in compounds of the present invention does not disqualify such compounds from being considered as non-halogenated flame retardant compounds.

Other Optional Additives

The compounds of the present invention can include other conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fire and flame retardants and smoke suppressants; initiators; lubricants; pigments, colorants and dyes; plasticizers; processing aids; release agents; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire compound.

TABLE 1

|  | Acceptable | Desirable | Preferable |
|---|---|---|---|
| PLA | 30-50 | 30-40 | 30-35 |
| Polycarbonate | 40-60 | 50-60 | 55-60 |
| Talc | 1-8 | 2-7 | 2-5 |
| Flame Retardant | 10-20 | 10-15 | 10-13 |
| Optional Acrylic Impact Modifier | 0-15 | 0-15 | 0-11 |
| Optional Drip Suppressant | 0-1.5 | 0-1.0 | 0-0.7 |
| Other Optional Additives | 0-10 | 0-10 | 0-10 |

Processing

The preparation of compounds of the present invention is uncomplicated and can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 700 revolutions per minute (rpm), and preferably from about 100 to about 300 rpm. Typically, the output from the extruder is pelletized for later shaping by extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later shaping by extrusion or molding into polymeric articles.

Optionally, prior to batch or continuous melt-mixing, one can dry the ingredients to help reduce the possibility of a moisture-activated degradation or reaction in the melt-mixing vessel. Alternatively, one can use other ways to reduce degradation possibilities, such as incorporating a moisture scavenger or desiccant into the formulation, applying a vacuum within the melt-mixing vessel, etc. Any of these techniques, or combination of techniques, results in the ingredients being dried before or during melt-mixing.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elesevier.com), one can make articles of any conceivable shape and appearance using compounds of the present invention.

Regardless of optional drying or other techniques during melt-mixing, it has been found that minimizing the moisture content in the compound before molding can have a direct effect on performance properties, including heat deflection temperature. Moisture content should be less than about 0.2%. The amount of drying should be much closer to about 48 hours than about 4 hours, preferably between 4 and 12 hours, in order to achieve an essentially dry blended compound prior to molding, i.e., having a moisture content of less than 0.2%. To reduce the possibility of drying at a temperature approaching the heat deflection temperature of 65° C., the temperature can be up to about 60° C. without vacuum. Indeed, without undue experimentation, one can identify the best combination of time, temperature, and atmospheric pressure to reduce the time of drying while maximizing the amount of drying, without approaching a temperature which would degrade or otherwise affect performance of the compound shaped as a molded or extruded product.

Usefulness of the Invention

Any plastic article is a candidate for use of the compounds of the present invention. With the heat durability of PLA now achieved, all types of plastic articles which required an elevated HDT (and preferably a HDT of at least 65° C. at 66 psi), previously made from fossil-derived polymers, can now be made from a sustainable PLA polymer compound.

Plastic articles made from compounds of the present invention can be shaped via molding or extruding for use in the transportation, appliance, electronics, building and construction, biomedical, packaging, and consumer markets.

Non-limiting examples of final plastic articles benefiting from non-halogenated flame retardant PLA/PC compounds include electronic article parts of all types, such as computer server housings, cell phone covers, cameras, etc.

Examples prove the unexpected nature of the present invention.

EXAMPLES

Comparative Example A and Examples 1-9

Table 2 shows the extrusion conditions. Table 3 shows the molding conditions. Table 4 shows the recipes and the specific gravity according to ASTM D-792, tensile properties according to ASTM D-638, flexural properties according to ASTM D-790, Notched Izod impact according to ASTM D-256, HDT at 66 psi according to ASTM D648, and flame retardance according to ASTM D-635.

TABLE 2

Extruder Conditions
The Comparative Example and All Examples

| | |
|---|---|
| Extruder Type | WP 25 mm twin screw extruder |
| Order of Addition | All ingredients mixed together and fed into the extruder hopper. |
| All Zones and Die (° C.) | 200~210° C. |
| RPM | 450 |

TABLE 3

Molding Conditions
All Comparative Examples and Examples
88 ton Nissei molding machine

| Drying Conditions before Molding: | |
|---|---|
| Temperature (° C.) | 70 |
| Time (h) | 6 |
| Temperatures: | |
| Nozzle (° C.) | 228 |
| Zone 1 (° C.) | 223 |
| Zone 2 (° C.) | 221 |
| Zone 3 (° C.) | 221 |
| Mold (° C.) | 65 |
| Oil Temp (° C.) | 29 |
| Speeds: | |
| Screw RPM (%) | 50 |
| % Shot - Inj Vel Stg 1 | 40 |
| % Shot - Inj Vel Stg 2 | 35 |
| % Shot - Inj Vel Stg 3 | 30 |
| % Shot - Inj Vel Stg 4 | 20 |
| % Shot - Inj Vel Stg 5 | 10 |
| Pressures: | |
| Hold Stg 1 (mPa) - | 3.5 |
| Time (sec) | 5 |
| Hold Stg 2 (mPa) - | 3 |
| Time(sec) | 5 |
| Timers: | |
| Injection Hold (sec) | 7 |
| Cooling Time (sec) | 20 |
| Operation Settings: | |
| Shot Size (mm) | 55 |
| Cushion (mm) | 1.5-1.8 |

TABLE 4

| | Example | | | | | | | | | |
|---|---|---|---|---|---|---|---|---|---|---|
| | 1 | 2 | 3 | 4 | 5 | A | 6 | 7 | 8 | 9 |
| | Sample # | | | | | | | | | |
| | 1 | 2 | 3 | 4 | 5 | 6 | 2 | 3 | 4 | 5 |
| INGEO 4032D PLA (NatureWorks) | 30 | 30 | 30 | 30 | 30 | 30 | 35 | 40 | 30 | 30 |

TABLE 4-continued

| | Example | | | | | | | | | |
|---|---|---|---|---|---|---|---|---|---|---|
| | 1 | 2 | 3 | 4 | 5 | A | 6 | 7 | 8 | 9 |
| | Sample # | | | | | | | | | |
| | 1 | 2 | 3 | 4 | 5 | 6 | 2 | 3 | 4 | 5 |
| MAKROLON 2205 PC (Bayer) | 46.3 | 48.3 | 50.3 | 52.3 | 53.3 | 54.3 | 47.3 | 42.3 | 54.3 | 57.3 |
| TEFLON 6C PTFE (DuPont) | 0.7 | 0.7 | 0.7 | 0.7 | 0.7 | 0.7 | 0.7 | 0.7 | 0.7 | 0.7 |
| MISTRON VAPOR-R TALC (Luzenac America) | 8 | 6 | 4 | 2 | 1 | 0 | 2 | 2 | 2 | 2 |
| REOFOS RDP (Chemtura) | 15 | 15 | 15 | 15 | 15 | 15 | 15 | 15 | 13 | 10 |
| Total | 100 | 100 | 100 | 100 | 100 | 100 | 100 | 100 | 100 | 100 |
| Specific Gravity (ASTM D-792) | 1.31 | 1.29 | 1.28 | 1.25 | 1.25 | 1.24 | 1.26 | 1.26 | 1.26 | 1.25 |
| Ultimate Tensile @ yield (psi) (ASTM D-638) | 9190 | 9610 | 9710 | 9000 | 9010 | 9220 | 9300 | 9300 | 9290 | 9295 |
| Tensile Modulus (psi) (ASTM D-638) | 479584 | 462139 | 436333 | 365646 | 373840 | 367897 | 382000 | 404000 | 375000 | 384000 |
| Elongation @ Break (ASTM D-638) | 20 | 21 | 35 | 22 | 24 | 35 | 26 | 28 | 67 | 68 |
| Flexural Modulus (psi) (ASTM D-790) | 580000 | 581000 | 533000 | 458000 | 468000 | 450000 | 488000 | 494000 | 496000 | 490000 |
| Flexural Yield (psi) (ASTM D-790) | 15410 | 15820 | 15690 | 14700 | 14940 | 15030 | 15045 | 14900 | 15635 | 15615 |
| HDT @ 66 PSI (deg C.) (ASTM D-648) | 68 | 70 | 70 | 70 | 73 | 73 | 66 | 65 | 76 | 86 |
| Izod, 1/8" (3.57 mm) RT (ft-lb/in) (ASTM D-256) | 0.6 | 0.5 | 0.5 | 0.5 | 0.3 | 0.3 | 0.6 | 0.5 | 0.5 | 0.5 |
| Flame testing 3.2 mm (ASTM D-635) | V-0 | V-0 | V-0 | V0 | V-0 | V-2 | V-0 | V-0 | V-0 | V-0 |
| Flame testing 1.6 mm (ASTM D-635) | V-0 | V-0 | V-0 | V0 | V-0 | V-2 | V-0 | V-0 | V-0 | V-0 |
| Flame testing 0.8 mm (ASTM D-635) | V-1 | V-1 | V-0 | V0 | V-2 | V-2 | V-2 | V-2 | V-2 | V-2 |

Table 4 shows the progression of experimentation to produce this invention. All of Examples 1-5 demonstrated that the combination of talc at from 1 to 8 weight percent and resorcinol bis (diphenyl phosphate) at 15 weight percent produced PLA/PC thermoplastic compounds that had a HDT of at least 65° C. and a flame test at 3.2 mm and 1.6 mm thicknesses of V-0.

Comparative Example A demonstrated, that even with resorcinol bis (diphenyl phosphate) at 15 weight percent but no talc failed to result in even a V-1 flame retardance rating. V-2 flame retardance at all thicknesses was completely unacceptable.

Examples 4 and 6-8 demonstrated that a constant 2 weight percent of talc and a variety of amounts of PLA between 30-40 weight percents and a variety of resorcinol bis (diphenyl phosphate) amounts between 10-15 weight percent resulted in HDT of at least 65° C. and a flame test at 3.2 mm and 1.6 mm thicknesses of V-0. This means that a person having ordinary skill in the art, without undue experimentation, can modify the amounts of the ingredients to produce a variety of acceptable heat resistant, flame retardant PLA/PC thermoplastic compounds in which the PLA is a significant component.

Examples 3 and 4 demonstrated that it was possible to achieve a V-0 flame retardance rating at 0.8 mm thickness and a HDT of greater than 69° C.

Of the various Examples, Examples 8 and 9 are presently preferred because they have both V-0 at 3.2 and 1.6 mm thicknesses and HDT greater than 75° C.

The invention is not limited to the above embodiments. The claims follow.

What is claimed is:

1. A heat resistant, flame retardant, polylactic acid compound, comprising:
    (a) polylactic acid in an amount from about 30 to about 35 weight percent of the compound;
    (b) polycarbonate in an amount from about 50 to about 60 weight percent of the compound;
    (c) talc in an amount from about 2 to about 5 weight percent of the compound; and
    (d) resorcinol bis (diphenyl phosphate) in an amount from about 10 to about 13 weight percent of the compound;
    wherein the compound has a heat distortion temperature of greater than 75 degrees C. when tested according to ASTM D-648 at 66 PSI; and
    wherein the compound has a V-0 rating when tested according to ASTM Test No. D-635 at both 3.2 mm and 1.6 mm thicknesses.

2. The compound of claim 1, wherein an acrylic impact modifier is present in an amount of from about 1 to about 15 weight percent of the compound.

3. The compound of claim 1, wherein the polylactic acid comprises poly-D-lactide, poly-L-lactide, or a combination of both.

4. The compound of claim 2, wherein the impact modifier is a core/shell acrylic polymer.

5. The compound of claim 1, further comprising one or more optional additives selected from the group consisting of adhesion promoters; biocides; anti-fogging agents; anti-static agents; bonding, blowing and foaming agents; dispersants; initiators; lubricants; pigments, colorants and dyes; plasticizers; processing aids; release agents; slip and anti-blocking agents; stabilizers; stearates; ultraviolet light absorbers; viscosity regulators; waxes; and combinations of them.

6. A plastic article shaped from a compound of claim 1.

7. The article of claim 6, wherein the article is molded or extruded and wherein the article is shaped for use in transportation, appliance, electronics, building and construction, packaging, or consumer markets.

8. A method of making the compound of claim 1, comprising the steps of
   (a) gathering ingredients including polylactic acid, polycarbonate, talc, and resorcinol bis (diphenyl phosphate),
   (b) melt-mixing them into a compound.

9. The article of claim 7, wherein before molding or extrusion the compound has been dried to a moisture content of less than 0.2%.

* * * * *